(12) United States Patent
Doler et al.

(10) Patent No.: US 6,484,911 B1
(45) Date of Patent: Nov. 26, 2002

(54) LUGGAGE CONTAINER

(75) Inventors: Thorbjorn Doler, Snorsvall, N-3290 Stavern (NO); Ole James, Anvik, N 3290 Stavern (NO)

(73) Assignees: Thorbjorn Doler, Stavern (NO); Ole James, Stavern (NO); Per Myrvoll, Stavern (NO); Gisle Dyhre, Stavern (NO)

( * ) Notice: Subject to any disclaimer, the term of this patent is extended or adjusted under 35 U.S.C. 154(b) by 0 days.

(21) Appl. No.: 09/622,600
(22) PCT Filed: Aug. 19, 1998
(86) PCT No.: PCT/NO98/00244
§ 371 (c)(1), (2), (4) Date: Oct. 5, 2000
(87) PCT Pub. No.: WO99/43536
PCT Pub. Date: Sep. 2, 1999

(30) Foreign Application Priority Data

Feb. 25, 1998 (NO) ................................................ 980779

(51) Int. Cl.[7] ................................................ A45F 4/02
(52) U.S. Cl. ........................ 224/153; 224/413; 224/417; 224/432; 224/463; 224/585; 190/105; 190/107
(58) Field of Search ................................ 224/153, 413, 224/417, 432, 463, 320, 328, 629, 585; 150/167; 190/103, 22, 21, 104, 105, 107; 220/666

(56) References Cited

U.S. PATENT DOCUMENTS

| | | | | |
|---|---|---|---|---|
| 1,806,246 A | * | 5/1931 | Feldman et al. | 190/103 |
| 2,907,420 A | * | 10/1959 | Doppelt | 190/103 |
| 3,938,716 A | * | 2/1976 | Jackson et al. | 224/413 X |
| 4,059,207 A | * | 11/1977 | Jackson et al. | 224/413 |
| 4,953,673 A | * | 9/1990 | Ambasz | 190/103 |
| 5,251,731 A | * | 10/1993 | Cassese et al. | 190/103 |
| 5,405,068 A | * | 4/1995 | Lovett | 224/153 |
| 6,179,186 B1 | * | 1/2001 | Blanking | 224/629 |
| 6,202,910 B1 | * | 3/2001 | Swetish | 190/104 |
| 6,253,977 B1 | * | 7/2001 | Gregor et al. | 224/413 |

* cited by examiner

Primary Examiner—Stephen K. Cronin
(74) Attorney, Agent, or Firm—Pitney, Hardin, Kipp & Szuch LLP

(57) ABSTRACT

Luggage container, the side walls (3) of which are flexible and at one end fixed to a top rim (2) and at the other end to the bottom (1) of the container, a limiting device (6) being detachable to and across the open top rim (2), strap members (5) being secured to the top rim (2) being securable to a base, thereby securing the container as such to a base as well as compressing the limitation device (6) and the side walls (3) together with the content of the container.

5 Claims, 1 Drawing Sheet

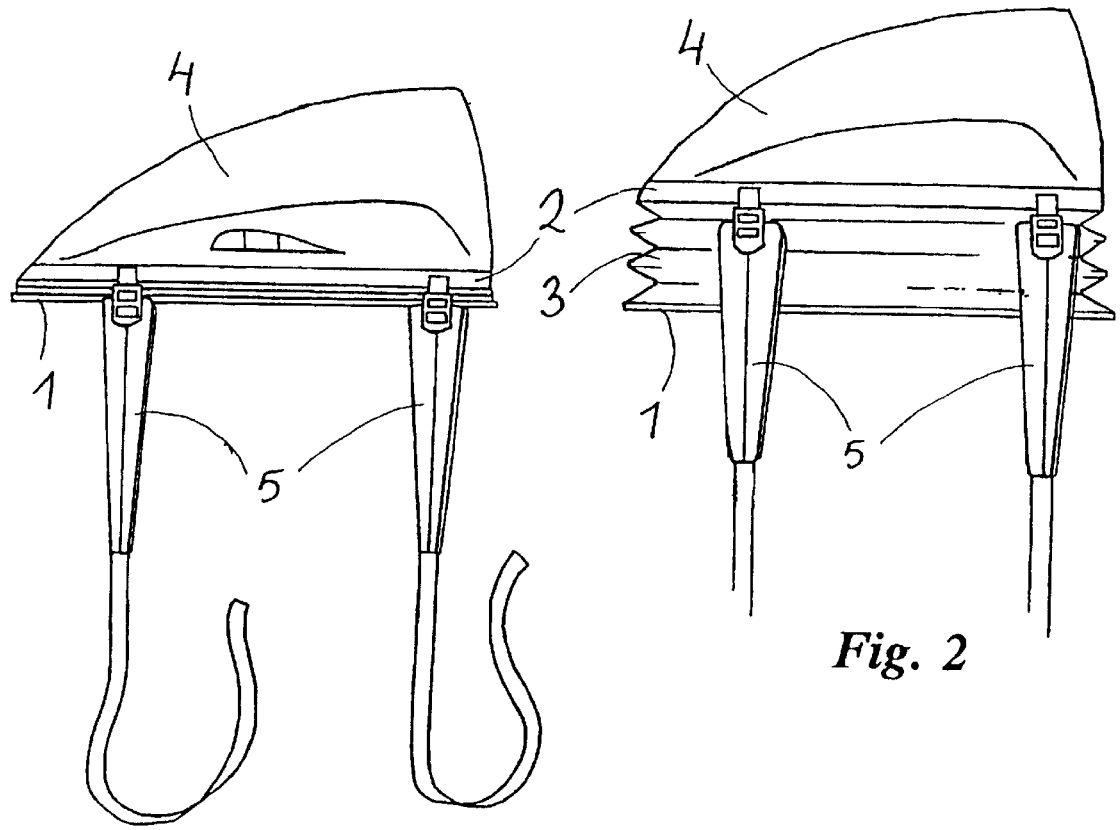
Fig. 1
Fig. 2
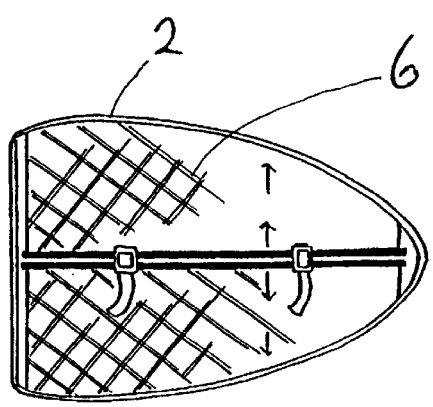
Fig. 3
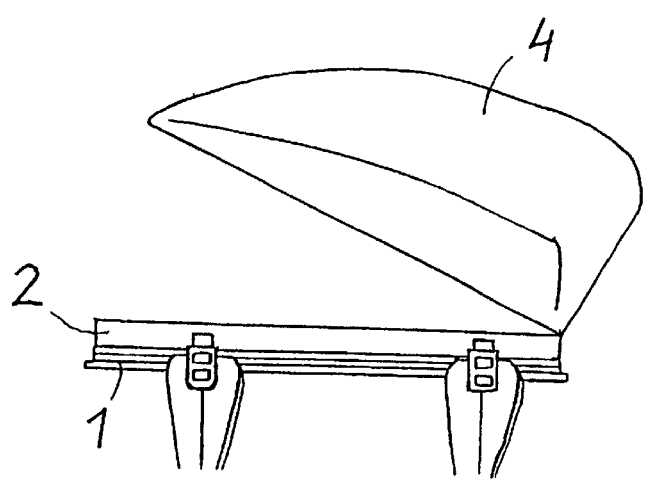
Fig. 4

LUGGAGE CONTAINER

BACKGROUND OF THE INVENTION

1. Field of the Invention

The present invention is related to a luggage container, especially adapted for use as aftmounting on motorcycles and as a rucksack.

2. Description of the Prior Art

For most motorcyclist it is a disadvantage that bags and containers mounted or strapped to the motorcycle occupies the same space whether they are filled or empty. In cases where little luggage is brought along, such containers create turbulence and high air resistance. At high speed situations may occur when the motorcycle becomes unstable.

On the market are available bags or containers, soft as well as hard, but there are no product combining the advantage with hard containers as such may be completely watertight. They also normally very easily can be loaded as simply a cover is opened without taking the container off the motorbicycle.

Soft containers or bags assume small space when the load is little, but seams and zippers are not quite watertight. It is often also more difficult to load soft bags when they are strapped to the bicycle.

SUMMARY OF THE INVENTION

The container according to the present invention combines advantages of soft and hard bags or containers, thereby avoiding the disadvantages. This is achieved with the container according to the present invention as described with the features stated in the claims.

BRIEF DESCRIPTION OF THE DRAWINGS

The drawing discloses in FIG. 1 a sideview of the container according to the invention, in the collapsed position, FIG. 2 discloses the container in FIG. 1 in a medium-filled position, FIG. 3 discloses a groundview into the container when the lid is removed, and FIG. 4 discloses a sideview corresponding to FIGS. 1 and 2 with the lid half-opened.

DETAILED DESCRIPTION OF THE PREFERRED EMBODIMENT

The motorcycle container according to the present invention primarily is developed for sport and touring motorcycles, are however well suited also for other types of motorcycles.

As disclosed in FIG. 1, the container comprises a bottom 1 with a surrounding rim. To the rim is secured a flexible fabric wall or bellow 3 and on top of the bellow i secured a top rim 2. A lid 4 is hinged to the top rim 2 and a locking device 7 is adapted to secure the lid 4 in the closed position.

Strap members 5 are connected with the top rim 2, enabling strapping of the container as such to the motorcycle in a suitable way, depending on the motorcycle type.

The bottom 1 preferably is made of hard rubber with cells to provide a good set against the motorcycles, avoid scratches and also provide a comfortable surfaces against the back of the motorcyclist in cases where the motorcyclist carries the container as a rucksack. The shape of the bottom 1 and the material also ensures that the container as such will not fall backwardly on and cover the rear lights on the motorcycle, especially in cases where the container as such is longer than the passenger seat on the motorcycle.

Principly, the size and shape of the bottom 1 correspondence with the shape of the top rim 2, whereas the size of the top rim 2 is a little larger than the bottom 1, in such a way that when the top rim 2 is at its lowest position, it surrounds the bottom 1.

The container according to the invention is filled-up with luggage or what is needed and the top rim 2 is lifted according to the amount of luggage, whereby the fabric or bellow 3 will rise to a height corresponding with the amount of luggage. When all luggage is placed in the bellow 3, a net 6 secured to the top rim 2 is pulled across the luggage and secured. Thereafter the strap members 5, two on each sides of the motorcycle, are connected with suitable parts on the motorcycle and tightened, which means that the luggage is tightened against the motorcycle by the net 6 and the bellow 3. Instead of a net 6 another arrangement may be used as the upper wall of the container, such as a rigid plate or other suitable arrangement, to be secured to the rim 2.

By use of the net 6 it is avoided that the load will move during driving and also that the load will press against the lid 4 when the container is strapped to the motorcycle, thereby avoiding the risk that the lid 4 opens during driving.

The lid 4 preferably has an aerodynamic shape, more or less like a semi droplet and being hinged at the front end of the lid to the top rim 2. The shape of the lid 4 ensures that the air resistance due to turbulence behind the back of the motorcyclist, is minimized.

The container according to the present invention may be secured to the motorcycle on the passengers seat or on other suitable devices, depending on which motorcycle is in use. The container according to the present invention, may be used as a rucksack as the strap members 5 have been given a length and shape enabling such a use. In cases where the motorcyclist drives with the container according to the invention on his back as a rucksack, the container also provides for a security should the motorcyclist fall of the motorcycle and land on his back.

What is claimed is:

1. A luggage container for a motorcycle, including:

flexible side walls with a top end and a bottom end, a top rim to which said top end is attached, a bottom to which said bottom end is attached, a limiting device which is detachable to and across said top rim, and strap members being secured to the top rim and securable to a motorcycle thereby securing the container to a motorcycle as well as compressing the limiting device and the side walls together with contents of the container whereby a height of the container corresponds to a height of contents of the container.

2. The luggage container of claim 1 further including a lid which is securable to an outside of said top rim, said lid thereby having a teardrop shape, thereby adapting the container to be used as an aftmounted container on motorcycles, said lid further being lockable to said top rim.

3. The luggage container of claim 1 wherein said strap members are further used as shoulder straps thereby allowing the container to be used as a rucksack.

4. The luggage container of claim 1 wherein said flexible wall is made of flexible material formed as a bellows.

5. The luggage container of claim 1 wherein said limiting device is secured across an opening of said rim thereby withstanding upward forces when said strap members press against said rim toward said bottom of the container.

* * * * *